United States Patent [19]
Hipp et al.

[11] Patent Number: 5,321,410
[45] Date of Patent: Jun. 14, 1994

[54] ADAPTIVE DOPPLER DF SYSTEM

[75] Inventors: Jackie E. Hipp; William G. Guion, both of San Antonio, Tex.

[73] Assignee: Southwest Research Institute, San Antonio, Tex.

[21] Appl. No.: 782,971

[22] Filed: Oct. 22, 1991

Related U.S. Application Data

[63] Continuation of Ser. No. 207,621, Jun. 9, 1988, abandoned.

[51] Int. Cl.[5] ............................................. G01S 5/04
[52] U.S. Cl. .................................... 342/442; 342/445
[58] Field of Search ............... 342/417, 442, 445, 446, 342/394, 424

[56] References Cited

U.S. PATENT DOCUMENTS 4,207,572 6/1980 Hipp et al.
4,639,733 1/1987 King et al. .......................... 342/424

Primary Examiner—Theodore M. Blum
Attorney, Agent, or Firm—Donald Gunn

[57] ABSTRACT

In an antenna array of N elements in a circle around a large through mast, direction finding capabilities are enhanced for an incoming signal where fewer elements are needed compared to standard quasi-Doppler or pseudo-Doppler methods. Azimuth detection takes advantage of the scattered wave from the through mast where measurements of amplitude and relative phase shift shows an induced distortion pattern from through mast scattered waves. Analyzing the amplitude and phase measurements determines the azimuth angle of the arrival of the incoming signal.

21 Claims, 3 Drawing Sheets

ADAPTIVE DOPPLER DF SYSTEM

This is a continuation of application Ser. No. 07/207,621 filed Jun. 9, 1988, now abandon.

BACKGROUND OF THE DISCLOSURE

Conventional quasi-Doppler direction finding (DF) systems require that (1) the diameter of any supporting mast be small compared to the array diameter and (2) the spacing between adjacent antenna elements arranged in a circle be sufficiently small to ensure that the actual phase difference between signals from adjacent elements is less than 180° in magnitude. A failure to meet either of these two constraints produces direct and sometimes large DF error. Relative to the first constraint above, any propagating wave incident upon a large mast supporting the array produces a scattered wave which interferes with the incident wave to distort the antenna pattern of each antenna element and to thereby produce errors in the measured direction of arrival of the incident wave. Relative to the second constraint above, the measured phase between any two signals is a cyclic function of delay between the two signals, with the cycle period being 360° of phase. Consequently, phase measuring instrumentation is unable to discriminate between any given phase and a phase that differs by integer multiples of 360° from the given phase. Properly designed phase measurement instrumentation provides accurate values of actual phase differences as long as the actual phase differences are less than 180° in magnitude, but such phase measurement instrumentation produces very large phase errors (360°, 720° or more of "phase ambiguity error") whenever the actual phase differences are bipolar and exceed 180° in magnitude. As a result, whenever the separation between adjacent antenna elements produces actual phases that differ by more than 180°, severe DF error results. These phase ambiguities can be avoided in conventional quasi-Doppler systems by appropriately increasing the number of elements, thereby reducing the inter-element spacing and the inter-element phase. However, the increased number of elements contributes to increased system complexity, and can lead to problems from increased mutual coupling between the elements. Alternatively, the number of elements can remain fired and the array diameter decreased to reduce the inter-element spacing. However, decreasing the array diameter decreases direction finding accuracy and raises the lower operating frequency of the array.

The present invention provides accurate measurements of azimuth angle of arrival of a transmitted signal at an antenna array supported on a large central support mast and allows the actual phase difference between adjacent elements to exceed 180° in magnitude. The ability to perform DF under the resulting condition of distorted antenna patterns and phase ambiguities results from observing that the actual phase and amplitude pattern distortions of the antenna elements are repeatable functions of frequency and can be exploited to eliminate phase ambiguities. The impact of pattern distortion on DF accuracy is minimized in the present invention by using Fourier processing to eliminate harmonic distortion in the antenna phase pattern.

The invention includes a circular array of N identical antenna elements arranged symmetrically about a central support mast. The signal from each element is processed to provide data points (i.e., samples) of the amplitude pattern and the unresolved phase (i.e., including possible phase ambiguity errors) pattern. The samples of the antenna patterns are processed to provide a coarse azimuth estimate of the radial line of symmetry for the array antenna pattern. The radial line of symmetry ideally points to the direction of arrival of the incident signal, and it provides a starting azimuth for resolving the 360° ambiguities that are inherent in the phase measurements. After using the line of symmetry as an azimuth to approximately align the sample phase pattern with the expected shape of the distorted phase pattern, each phase measurement is resolved by adding or subtracting the necessary multiple of 360° required to minimize the difference between the resolved phase measurement and the expected shape of the distorted phase pattern. The set of resolved phase measurements describing the distorted phase pattern is then filtered by use of Fourier analysis to eliminate harmonic distortion within the pattern. The measured value of azimuthal direction of arrival of the incident wave is determined as the azimuth at which the filtered phase pattern is maximum.

The present invention enables the N antenna elements to be installed on a support mast common to other antenna systems. The common through mast may support other antenna systems higher and/or lower on the through mast. As an example, a large through mast on a ship may support several antenna systems at different heights on the same mast.

OTHER ANTENNA SYSTEMS

The foregoing discusses the possibility of a central distorting mast typically supporting and otherwise surrounded by N antenna elements. Another possibility occurs in the instance where there is no central mast. While the foregoing system overcomes distortion from the central mast, an alternate approach is N antenna elements arranged in a circle with even spacing where there is no central mast. In this system, there may be no distortion or the distortion may be of a symmetrical nature, e.g. other distortion sources such as other antennas, obstacles in the near area which create multipath propagation and the like.

From this, it is possible to use the present antenna system where the distortion is in the amplitude or phase or both and still determine azimuth of the DF source to the N antenna elements arranged in a circle. In one instance, the only data of value is the phase angle. The antenna system (without mast) can be a land supported installation. Assume that the antenna system includes N preferably identical antenna elements evenly spaced. The radius of the N antenna elements from the center of the circle can be increased to a larger circle. This larger circle will provide a higher quality DF azimuth signal.

To summarize, the present invention incorporates several facets which include the following noteworthy features.

First of all, it is an antenna system which can utilize a wide variety of N identical antenna elements, including vertical dipoles. In addition, other types of antenna elements can be used including those which are omnidirectional, dipoles, monopoles, biconical, disc cone, crossed quadrature summed loops, horizontal loops, and o&her elements. Secondly, it is an antenna system which can work in a close confined space, such as aboard ship, supported on a large mast which extends through the antenna system. However, another extreme of installation can be obtained in a large diameter circle as for instance supported in a field.

A third important factor is that the system will operate with a large central through mast which creates a symmetrical, cylindrical disturbance but it also can work without a central mast or other distorting member.

In another aspect of the present invention, it is able to work quite well with distortion of a symmetrical nature (for example a central through mast) or with no distortion.

An important aspect of the present apparatus is that it accomodates distortion found in the phase and amplitude measurements on the one hand but also operates successfully if there is no distortion in both the phase or amplitude data.

As will be understood, this provides a versatile system such that the antenna system is able to accommodate these and many other variations and yet still provide direction finding capability for a remote transmitter source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
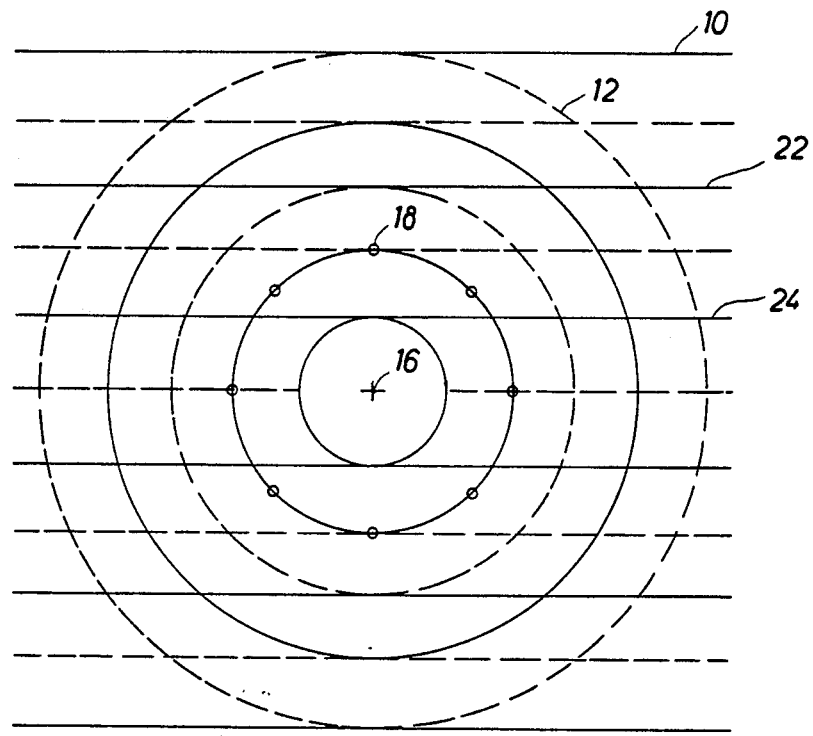
FIG. 1 shows a circular array of vertical dipole elements surrounding a large through mast, and shows superposition of the incident incoming wave added to a cylindrical wave front scattered from the mast.

Attention is first directed to FIG. 1 of the drawings. There, an incident wave identified by the numeral 10 is inbound toward an antenna system as will be described. The incident wave is conveniently shown to be arriving from the north, or having an azimuth of 0°. This is a convenience which makes discussion of the system somewhat easier. The incident wave front originates at a transmitter at some remote location wherein the direction of arrival of the incident wave 10 is to be determined. The transmitter is at some distance and hence, the inbound wave from the far transmitter presents a planar wave front since the radius substantially approaches an infinite value for purposes of graphic representation in FIG. 1. FIG. 1 also shows a cylindrical wave front, this being a scattered wave formed by the central mast supporting the antenna system as will be described. This cylindrical wave front is identified by the numeral 12 and will be described as the scattered wave. The scattered wave 12 adds to the incident wave 10 with different relative phases at the N dipole locations so that different phase and amplitude values are observed at different antenna elements as will be described. The incident wave 10 has a frequency in a range of frequencies determined by the sensitive range of the system.

An antenna array is arranged around a large through mast 16. This mast is located in the center of the antenna array. The array incorporates a number N of vertical dipole elements. The dipole elements are collectively referred to with the numeral 18. This numeral refers to a group of N vertical dipole elements. In FIG. 1, there are eight elements, and they are identified as required as element 1, element 2, etc. The large through mast 16 is a large supporting mast causing the scattered wave 12 to be radiated from the mast 16 toward all the dipole elements 18. There are eight identical vertical dipole elements in this embodiment. The apparatus preferably works with a number N of identical antenna elements where N can be any number equal to or greater than 3, and the antenna elements can (in principle) be any configuration oriented to maintain array rotational symmetry about the central mast. The number of antenna elements is preferably sufficient so that the azimuthal spacing between adjacent elements allows sufficiently precise alignment between the sets of calibration and measured phase differences.

As observed in FIG. 1, the wave front 22 represents a positive peak at a selected instant in time while the wave front 24 represents another positive peak occurring at the same instant. Between the two positive peaks, there is a negative peak and hence, the graphic representations of FIG. 1 alternate between solid lines and dash lines to represent positive and negative peaks respectively. This alternating positive and negative peak arrangement is true for both the incident wave 10 and the scattered wave 12. For illustration simplicity, the radius of the N dipole element array shown in FIG. 1 has been drawn equal to a wave length. One full wave length represents the radius of the array at one particular frequency only. However, the DF antenna system is able to provide DF azimuth for incident signals in a range of frequencies, not just one frequency and this specific illustration is not a limitation on operation.

DISTORTION OF PHASE AND AMPLITUDE

Figure 2:
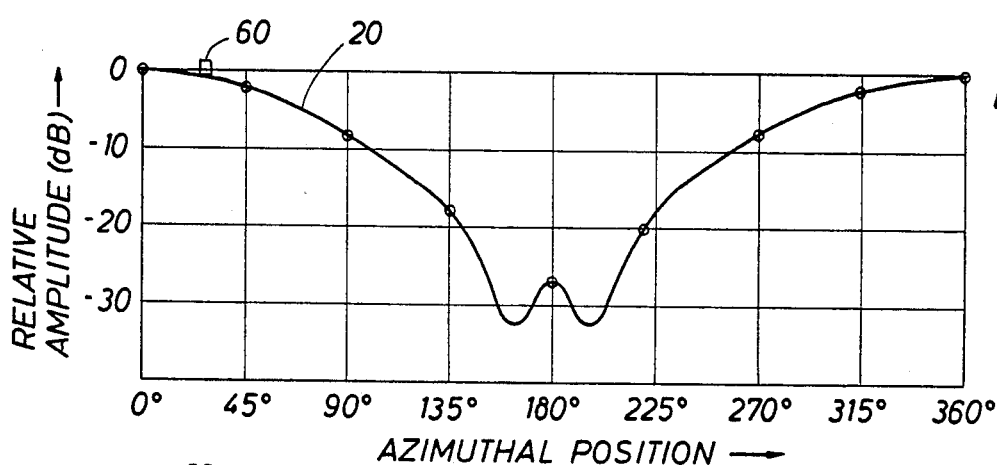
FIG. 2 shows relative amplitudes at the several dipole element positions around the large mast.

While the incident wave 10 is a planar wave, the scattered wave 12 is a cylindrical wave. The incident incoming planar wave 10 combines with the scattered cylindrical wave 12 to reinforce at some antenna elements and partially cancel at other elements of the array. Thus the relative amplitude differs from antenna element to element. In FIG. 2 of the drawings, the curve 20 represents the distorted amplitude pattern for the various dipoles (N=8) shown as data points on the curve 20. Should the large mast be omitted, the amplitude pattern of a vertical dipole element would be invariant with azimuth angle of the incoming wave from the transmitter.

The curve 20 in FIG. 2 is the distorted amplitude pattern around the array and is shown for 360° of azimuth around the antenna system. The amplitude pattern is cyclic, repeating every 360°. Thus, the curve 20 begins and ends with dipole element 1 arbitrarily located at 0° azimuth. The other elements are shown at evenly spaced selected azimuth locations around the circle and hence, they are evenly spaced with the azimuth abscissa of FIG. 2. Here, it is simply assumed that the planar wave is transmitted from a transmitter located at 0° azimuth.

In general terms, the curve shape 20 varies as a function of frequency, array diameter, and mast diameter, but does not vary as a function of N. The wave form shown in FIG. 2 will apply to a different number of dipole elements; the number of data points (N=8) on the curve 20 can be either increased or decreased by raising or lowering the number of dipole elements.

Figure 3:
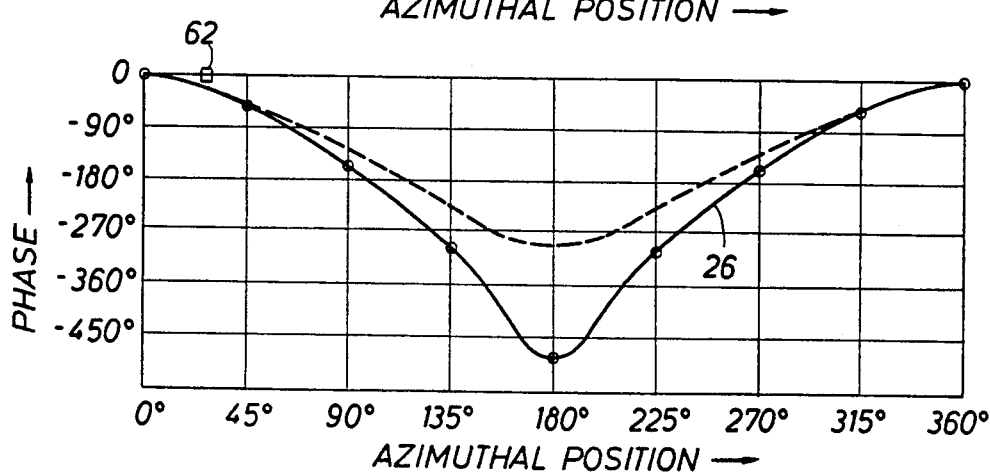
FIG. 3 shows relative phase at the several dipole positions around the large mast.

FIG. 3 discloses a distorted actual phase pattern 26. Again, it will be observed that each of the dipole elements provides a data point along the curve 26. The curve again begins and ends at the first dipole so that the data for the two ends of the curve 26 really represent the same data point. As in the case of the amplitude pattern, the phase pattern varies as a function of signal frequency, array diameter, and mast diameter, but does not vary as a function of N.

The curve 26 shows a total relative phase variation of approximately 450°. With N=8, the number of dipole elements is such that the maximum relative phase angle between the first and second dipoles is about 50°. The relative phase between the second and third dipole elements is about 100°. Examining the curve 26, the maximum relative phase between any two adjacent elements (the forth and fifth or fifth and sixth dipole elements) is limited to +/−200°. Where N equals 8, it can reasonably be said that in curve 26 the maximum relative phase shift between adjacent dipole elements is +/−200° regardless of transmitter azimuth. However, the maximum phase difference between adjacent elements changes with frequency and array geometry. As will be understood, in measuring the phase angle, the measurement is relative to one of the elements (or any other reference antenna for that matter) serving as a reference for phase. The sign of each measurement making up the curve 26 is important.

The curve shape can be replicated without regard to azimuth of the transmitter or value of N. Changes in transmitter azimuth merely shift the data points along the curve. The azimuthal spacing of the antenna elements (N=an integer) controls data point spacing and therefore maximum phase difference between data points on the curve 26.

AN EXAMPLE OF DATA EVALUATION

Figure 4:
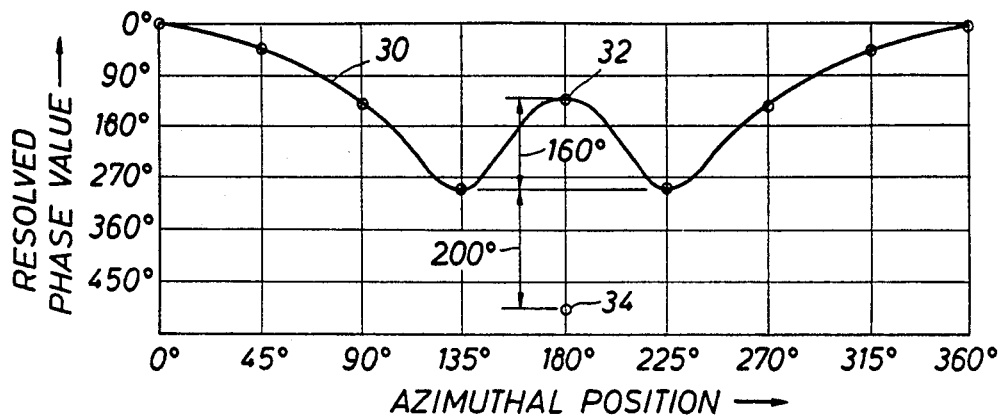
FIG. 4 is a graph similar to FIG. 3 except it shows erroneous phase resolution as an aid to explaining operation of the adaptive Doppler DF system.

FIG. 4 has been included to show the ambiguity that results from the eight data points of actual phase that were shown earlier in FIG. 3. The phase measured between any two signals is a cyclic function of delay between the two signals, with the cycle period being 360° in phase. Consequently, phase measuring instrumentation is unable to discriminate between any given phase and a phase that differs by multiples of 360° from the given phase, and will only provide phase values within some preestablished 360° interval. Since both positive and negative phase differences of any given magnitude are equally likely in a quasi-Doppler system, the preestablished 360° interval is logically set to the range of −180° to +180°, so that all measured phase differences will be reported in that interval. While the actual phase difference between dipole elements 4 and 5 was shown to be −200° in FIG. 3, the phase measurement instrumentation will report a value of +160° (360°−200°=160°). FIG. 4 thus includes the erroneous data point 32 and an erroneous smooth curve 30 that attempts to fit the measured phase differences. Thus, the curve 30 (through the point 32) is not true to the pattern shown by the curve 26 in FIG. 3. The phase measurement errors due to 360° ambiguities are corrected in the present invention by a process of adding or subtracting the necessary multiples of 360° to each phase measurement to bring the shape of a smooth fitting curve into closest agreement with the shape of an aligned, stored calibration curve of phase measurement differences versus azimuth. The shape of the calibration phase curve is a permanently stored set of resolved phase difference values for each pair of adjacent elements, beginning with the element on a radial line from the mast to the transmitter (the "north" element in the idealized case of FIG. 1). The calibration phase curve is a product of original phase measurements that are typically made under controlled circumstances before the DF system is ever placed into normal operation. During the calibration measurements, the DF system is excited by a distant controlled transmitter operating at known azimuths and rotated in small azimuthal increments, so that the actual phase difference between adjacent elements can be well known (i.e., measured) and unambiguous for a given transmitter frequency and direction of arrival. The resolved phase measurements associated with each antenna element for 0° direction of arrival are then permanently stored as calibration data for future use during normal DF operation. In the context of the present description, the curve 26 serves as the basis for a calibration phase curve.

The shape of the curve 26 should be found in the curve 30. Given the two possibilities of locating the data point at 32 or 34, the location 34 is correct since, if the curve 30 is drawn through the point 34, the shape conforms to that shown by the curve 26. It will then be understood that the shape of the curve must be maintained and ambiguous locations for the data point of dipole element 5 are then resolved by looking both at the shape of the curve and the phase shift. While the correct phase shift is −200° as drawn in FIG. 4, the wrong value is represented by +160°. Thus, the data point for element 5 could be located either +160° or −200° (at 32 or 34) from the data point for dipole element 4. Here, the shape of the curve is an aid and assistance to resolving ambiguity of the data points 32 and 34, rejecting the wrong data location.

FIGS. 3 and 4 thus illustrate how the shape of the curve plus the relative phase shift from dipole to dipole can be used to reconstruct the curve from data obtained from the various dipole elements. As will be described in detail, the resolved phase pattern 26 is used to determine the azimuth of the DF transmitter.

Figure 5:
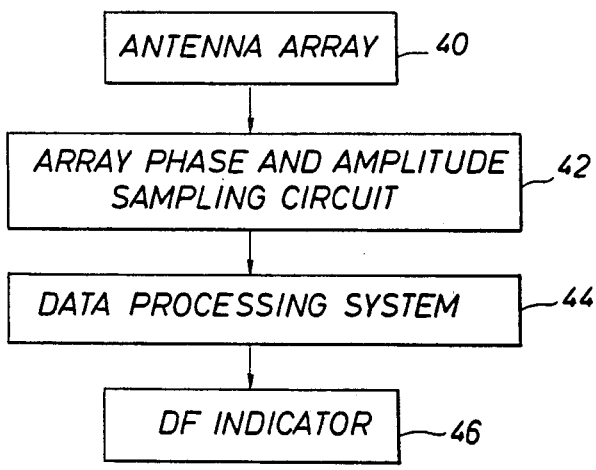
FIG. 5 is a schematic block diagram of the circuit components of the present invention including an antenna array, sampling circuit, data processing system, and DF indicator.

Attention is now directed to FIG. 5 of the drawings where the numeral 40 identifies an antenna array constructed in accordance with the teachings of this disclosure. The antenna array is connected with a sampling circuit 42. The sampling circuit samples both amplitude and phase measurements at N dipole elements. Thus, at a given instant in time, the peak amplitude at dipole element 1 is determined. Likewise, the phase is determined relative to some reference element. The phase and amplitude at each remaining element (elements 2 through 8 in this example) are also determined relative to the same reference element. The measured values of relative amplitude and phase are then passed to a data processing system 44. The data processing system 44 performs a processing sequence as will be described for providing a measured azimuth value to a DF indicator 46. This indicates the azimuth of the DF transmitter.

Figure 6:
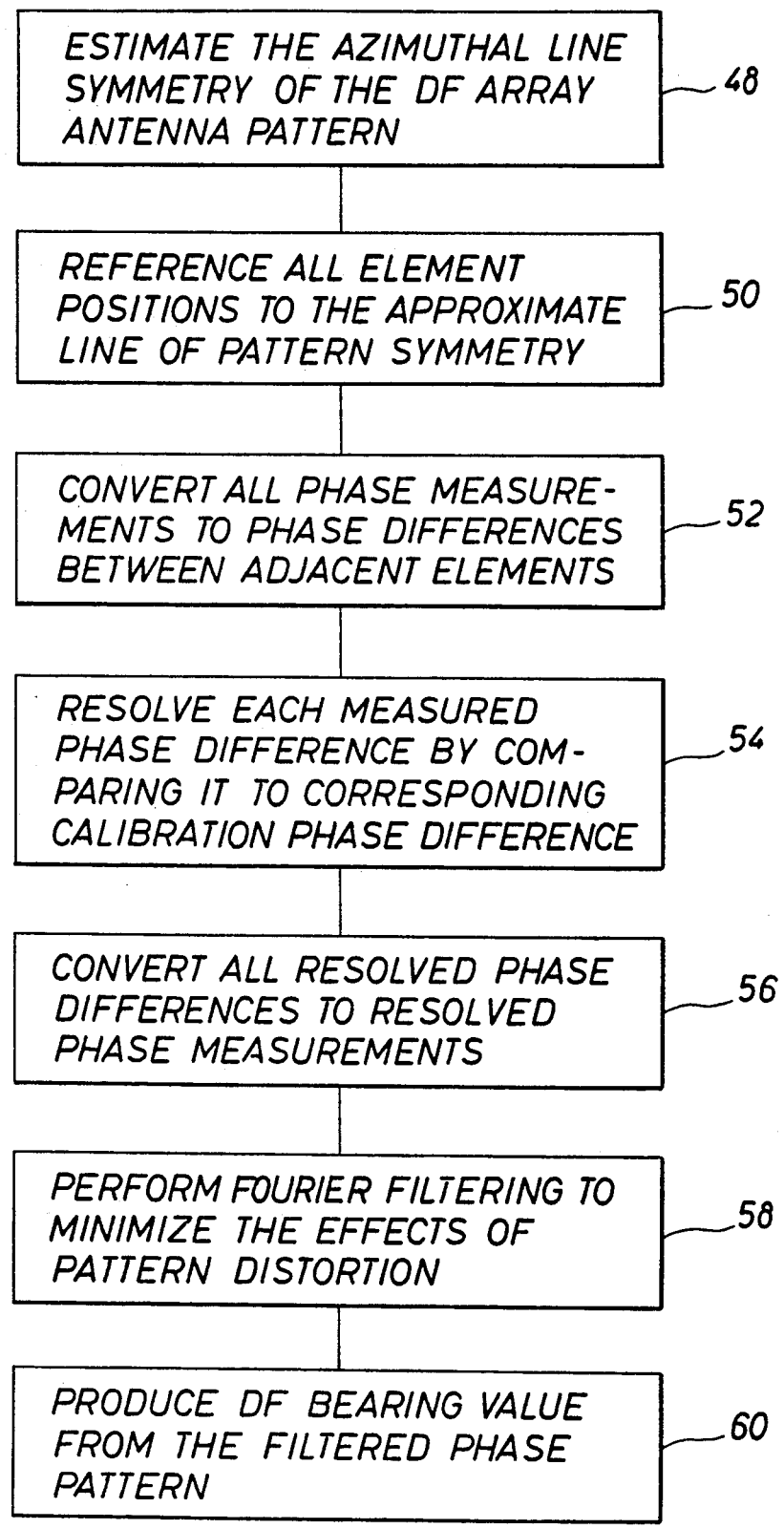
FIG. 6 is a flow chart representative of the sequence of steps in obtaining a solution for the transmitter azimuth.

Attention is now directed to FIG. 6 of the drawings. This sets forth a flow chart representative of the sequence of operations executed in the data processing system 44 when provided with inputs of the relative phase and amplitude measurements discussed regarding FIG. 5. The first step in the procedure is to determine which of the antenna elements is closest to the transmitter. This step 48 includes determining the approximate azimuth of the line of pattern symmetry from the samples of measured phase and/or measured amplitude....In many cases, the azimuth of the line of symmetry is reliably approximated by the azimuth of the element having the maximum signal amplitude relative to the signal from a fixed reference antenna. For a transmitter located at 0° azimuth, the maximum amplitude in this example is observed at dipole element 1. The 0° azimuth assumption was made as a convenience for laying out FIGS. 1-4 of the drawings. In actuality, the curve end points can be any of the eight elements, and further can be any one of N elements should N equal any other integer. Once a particular dipole element has been determined as being closest to the line of symmetry azimuth, the phase curve 26 is then presumed to take the approximate shape shown in FIG. 3 and that particular antenna element data point is located at the two end points of the curve. The estimated azimuth of the line of pattern symmetry is used to properly align the list of measured, unresolved samples of the phase pattern with the permanently stored list of calibration samples of the resolved phase pattern. To achieve this alignment the position of each antenna element is described in step 50 by its approximate position with respect to the pattern line of symmetry. Typically, alignment to the nearest element position is adequate for phase resolution.

Figure 7:
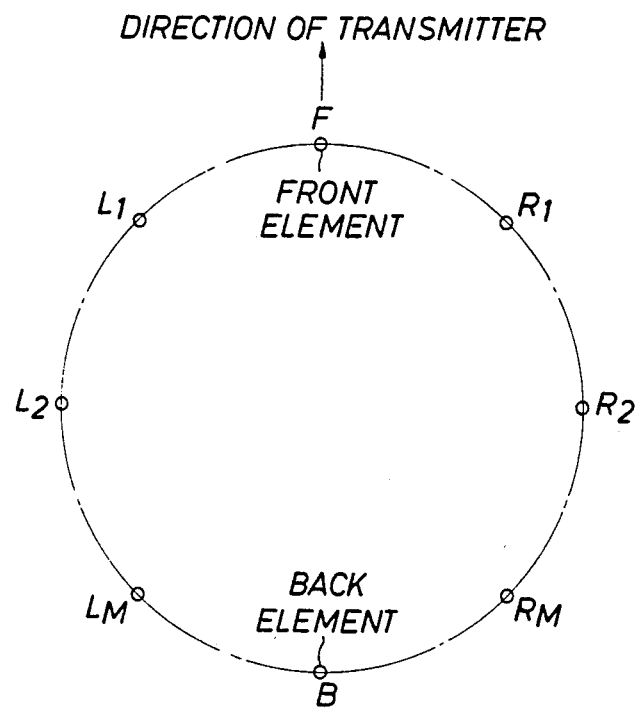
FIG. 7 shows the antenna element labeling scheme used in resolving the phase measurement ambiguities.

FIG. 7 shows the antenna element labeling scheme to be used in the following description of the phase resolution process. The element that was identified above in step 48 as the element closest to the approximate line of symmetry toward the transmitter is designated as the "front" element and assigned the label "F". The element that is 180° away is designated as the "back" element (a "back" element exists only if the number N of antenna elements is even), and assigned the label "B". The remaining antenna elements in FIG. 7 are assigned labels that describe their relative direction and relative position with respect to the front element. Each element in the right hand direction (i.e., the clockwise direction) is labeled as an "R" element with a subscript to indicate its relative position with respect to the front element. Similarly, each element in the left hand direction (i.e. the counterclockwise direction) from the front element is labeled as an "L" element, with a subscript to indicate its relative position with respect to the front element. If the total number N of antenna elements is even, then the number of elements between the front and back element on each side is $M=(N/2)-1$. Otherwise, the number of elements on each side of the front element is $M=(N-1)/2$. The M antenna elements on the right side of the front element, beginning with the element closest to the front element, are sequentially labeled $R_1$, $R_2$, ... $R_M$. Likewise, the M antenna elements on the left side of the front element, beginning with the element closest to the front element, are sequentially labeled $L_1$, $L_2$, ... $L_M$. The measured phase of each element is designated as P(Label), so that the measured phase of the front element is designated as P(F), etc.

Steps 52 through 56 involve a resolution of measured phases through a comparison between measured phase differences and stored calibration phase differences. The unresolved phases are measured with respect to some arbitrary, but fixed, reference antenna. However, in the preferred embodiment of this invention, phase resolution is achieved by an analysis of the phase difference between each antenna element and the next antenna element toward the front element. During the resolution processing, each unresolved phase measurement is therefore temporarily converted in Step 52 to a phase difference between adjacent elements. That phase difference is designated $P_d$(Label), and defined as follows:

$$P_d(R_1) = P(R_1) - P(F)$$
$$P_d(R_2) = P(R_2) - P(R_1)$$
$$P_d(R_3) = P(R_3) - P(R_2)$$
$$\ldots$$
$$P_d(B) = P(B) - P(R_M)$$

and $$P_d(L_1) = P(L_1) - P(F)$$
$$P_d(L_2) = P(L_2) - P(L_1)$$
$$P_d(L_3) = P(L_3) - P(L_2)$$
$$\ldots$$
$$P_d(B) = P(B) - P(L_M)$$

Note that the back element (if it exists) has two choices for phase relative to an adjacent element toward the front element. The measured phase for the back element (if the back element exists) is determined by separate considerations to be described later.

The stored calibration phases, designated $P_{cal}$(Label), are used as described below to resolve the phase measurement ambiguities. The resulting resolved phase differences between adjacent elements are each designated $RP_d$(Label). The resolved phase difference between adjacent elements is determined in step 54 by adding or subtracting the appropriate integer multiple of 360° that will minimize the magnitude of phase difference between the resolved phase difference and the calibration phase difference associated with the corresponding antenna element. That is, $$RP_d(\text{Label}) = P_d(\text{label}) + K*360 \text{ degrees.}$$

where
K is an integer chosen to minimize the magnitude of $[RP_d(\text{Label}) - P_{cal}(\text{Label})]$ and
Label is $R_1, R_2 \ldots R_M, L_1, L_2 \ldots L_M$.

This method is applied to the phase of each element (except the front and back elements) in the array. The phase of the front element is arbitrarily assumed to be resolved as measured. The resolution of the back element phase (if the back element exists) is described later.

At the completion of step 54, each resolved phase difference is the phase of a particular element with respect to the phase of the adjacent element toward the front element. To use the resolved phase measurements for determining the direction to the transmitter, it is desirable that the resolved phases be described in terms of a common phase reference, which for convenience is chosen to be the original phase measurement reference.

In step 56, the phase reference of each resolved phase difference is returned to the original reference by algebraically summing the front element phase with all the phase differences of the elements between the front element and the element in question as follows:

$$RP(R_i) = P(F) + \sum_{j=1}^{i} \{RP_d(R_j)\} \text{ for } i = 1,2,3,\ldots M$$

and in similar fashion $$RP(L_i) = P(F) + \sum_{j=1}^{i} \{RP_d(L_j)\} \text{ for } i = 1,2,3,\ldots M$$

The resolved phase of the back element (if it exists) is obtained by first identifying which of the two adjacent elements has the minimum algebraic (i.e., signed) value of resolved phase relative to the original phase measurement reference. The next step in resolving the phase of the back element is to resolve the phase difference between the back element and the above identified adjacent element. This phase difference is resolved by adding or subtracting the appropriate multiple of 360° that will minimize the magnitude of phase difference between the resolved back phase difference and the calibration phase difference associated with the back antenna element. The final step in resolving the phase of the back element is to reference the resolved back phase to the original phase reference. This step is accomplished by adding the resolved phase difference to the resolved phase of the adjacent element identified above.

The collection of resolved phase measurements referenced to the original phase reference describes the distorted phase pattern of the mast mounted array. To minimize the pattern distortion, the resolved, measured phase samples of the phase pattern are processed in step 58 by Fourier series analysis. The Fourier series analysis of the distorted phase pattern quantitatively reveals the presence of a fundamental component and multiple harmonic components. The fundamental component is a simple, single cycle sinusoidal variation with azimuth, and is completely consistent with the character of an ideal, undistorted phase pattern of a circularly disposed array of identical antenna elements. However, the harmonic components of the resolved phase pattern are not consistent with the ideal pattern, and are entirely due to the phase pattern distortion. The resolved samples of the distorted phase pattern are therefore processed in step 58 by a Fourier series analysis to filter out the harmonic distortion of the pattern, leaving only a simple, single cycle sinusoidal variation with azimuth. The two Fourier coefficients of the fundamental component are retained and used as the total input to an arctangent process in step 60 for predicting the azimuth angle of arrival of the incident signal. The azimuth angle of arrival of the incident signal is computed according to azimuth = arctan $(b_1/a_1)$ where $a_1$ is the Fourier coefficient of the fundamental cosine component of the resolved phase pattern; and $b_1$ is the Fourier coefficient of the fundamental sine component of the resolved phase pattern.

ANTENNA SYSTEM WITHOUT THE LARGE MAST

Returning now to FIGS. 2 and 3, omission of the large central through mast provides a response that is indicated by the dotted lines for amplitude and phase in FIGS. 2 and 3 respectively. As the amplitude approaches the ideal, its value as a means of providing a course azimuth estimate similarly disappears. Assuming an ideal pattern, meaning no distortion, amplitude measurements become meaningless. In like fashion, assuming that the phase measurements are not distorted, there nevertheless remains valuable information in the phase data. FIG. 3 has the approximate shape of one cycle of a sinusoidal wave form. If there is some distortion, the sinusoidal wave form can be restored by following the procedures set forth in FIG. 6. This sequence of analysis eliminates harmonic pattern distortion. Thus, the beginning point is establishing the line of symmetry towards the DF transmitter source which in FIG. 1 was assumed to be located at 0°. One can summarize the foregoing to show the following modes of operation with the present invention:

1. with a large through mast which causes distortion.
2. without a large through mast but with symmetrical distortion from some source; or
3. with no large through mast and no distortion.

The system operates in response to amplitude measurements where they are available and have significant data content. If they are not available, the system also responds to relative phase measurements.

In the instance that amplitude is discarded, the relative phase pattern should be that shown in FIG. 3. .This is primarily a single cycle of a sinusoidal wave form. It may or may not be subject to symmetrical distortion. This comparison of the measured versus the ideal pattern is described in the flow chart of FIG. 6, and can be understood graphically by observing the contrast between the ideal pattern in FIG. 3 and the distorted pattern in FIG. 3. The ideal pattern can be obtained from any source such as by storing the pattern in memory, by providing a mathematical model, by calculation, by storing in memory previously received patterns or by any other method of providing a pattern of relative phase measurements as exemplified in FIG. 3.

While the foregoing is directed to the preferred embodiment of the present disclosure, the scope thereof is determined by the claims which follow.

What is claimed is:

1. A system of determining DF transmitter azimuth, comprising:
   (a) N equally spaced antenna elements arranged in a horizontal circle around a center and subject to a source of symmetrical distortion where N is an integer;
   (b) phase measuring means for measuring the phase of the signal at each of said N antenna elements relative to a reference signal and wherein the measurements are subject to measurement ambiguities;
   (c) amplitude measuring means for measuring the amplitude of the signal at each of said N antenna elements and to determine which of the N antenna elements has maximum amplitude;
   (d) first responsive means responsive to antenna signals to determine the approximate azimuth of the DF transmitter to the antenna elements to define a line of symmetry to the antenna elements relative to the antenna element having maximum amplitude;

(e) determining means for determining an expected phase pattern of the antenna array as a function of azimuth with respect to the antenna elements line of symmetry;

(f) means connected to said phase measuring means for comparing the measured phase with expected phase from said determining means for resolving ambiguities in the measured phase to develop a resolved phase pattern;

(g) means responding to the approximate azimuth from said first responsive means to align within said comparing means said measured phase at the antenna elements with corresponding expected phase from said determining phase means; and (h) means in response to said aligned measured phase for processing the resolved phase pattern from said comparing means to produce the azimuth to the DF transmitter.

2. The system of claim 1 wherein the antenna elements are vertical dipole elements.

3. The system of claim 1 wherein the antenna elements are responsive to vertically polarized signal components.

4. The system of claim 1 wherein the measured phase is distorted, and including means for removing distortion to yield a sinusoidal shape.

5. The system of claim 1 including means for measuring amplitude at the N antenna elements which measurements determine the approximate azimuth of the antenna elements line of symmetry.

6. The system of claim 5 wherein the element with largest measured relative amplitude locates the approximate azimuth of the antenna elements line of symmetry.

7. The system of claim 1 wherein any unresolved phase measurements alone are used to determine the approximate direction of azimuth of the antenna elements line of symmetry.

8. The system of claim 7 wherein the unresolved phase measurement are correlated with expected phase differences to determine the approximate azimuth of the antenna elements line of symmetry.

9. The system of claim 1 wherein said N antenna elements are supported on a large centered through mast.

10. The system of claim 1 including means for filtering resolved measured phase to remove any harmonic distortion from the measured phase.

11. The system of claim 1 wherein said first means includes means for measuring sequentially between adjacent antenna elements of the circle.

12. The system of claim 11 wherein said first means measures relative phase between adjacent antenna elements.

13. The system of claim 12 wherein said first means measures relative amplitude between adjacent antenna elements, and said first means determines the approximate directed azimuth based on maximum relative amplitude.

14. A method of determining DF transmitter azimuth comprising the steps of:

(a) around a symmetrical source of distortion including a large through mast, arranging in a circle N antenna elements where N is an integer sufficiently large to obtain sufficiently precise alignment between stored reference phases and measured phases:

(a) wherein the large through mast scatters DF transmitter radiation to distort the antenna pattern detected at the N antenna elements and wherein the antenna elements respond to the DF transmitter within a specified frequency range to from output signals;

(b) determining which of the N antenna elements has maximum amplitude output signal;

(c) determining relative phase shift of the antenna elements with respect to the antenna element determined to have maximum amplitude;

(d) determining DF transmitter azimuth as a function of the relative phase shift between adjacent antenna elements for the N elements.

15. The method of claim 14 wherein the relative phase of N antenna elements is determined from simultaneously occurring values of phase said antenna elements.

16. The method of claim 14 wherein the relative phase shift between adjacent antenna elements is obtained from phase angle measurements occurring at N antenna elements relative to a reference proceeding in sequence from the reference.

17. The method of claim 14 wherein the relative amplitude of N antenna elements is maximum for the antenna element nearer the DF transmitter azimuth and amplitude relatively decreases for simultaneously obtained amplitude measurements for N antenna elements.

18. The method of claim 17 including the step of determining from antenna output signals which of the N antenna elements has maximum amplitude.

19. The method of claim 14 including the step of determining relative phase shift proceeding around the circle of N antenna elements from the antenna element determined to have maximum amplitude.

20. The method of claim 14 wherein the plot of phase shift for antenna elements defines a distorted sine wave.

21. The method of claim 14 wherein the relative phase shift of N antenna elements is stored in a sequence; and obtaining Fourier series coefficients of the sequence wherein the series including $b_1$ and $a_1$; and determining the arctangent $b_1/a_1$ to obtain an angle representing the angular displacement of the DF transmitter from a reference azimuth.

* * * * *